United States Patent [19]
von Thuna

[11] 3,937,086
[45] Feb. 10, 1976

[54] NOISE THERMOMETER

[75] Inventor: Peter C. von Thuna, Lexington, Mass.

[73] Assignee: Arthur D. Little, Inc., Cambridge, Mass.

[22] Filed: Nov. 8, 1974

[21] Appl. No.: 522,121

[52] U.S. Cl. .............................. 73/359; 73/362 AR
[51] Int. Cl.² .......................................... G01K 7/30
[58] Field of Search ............... 73/351, 359, 362 AR

[56] References Cited
UNITED STATES PATENTS

| | | | |
|---|---|---|---|
| 2,753,522 | 7/1956 | Marsden | 73/354 X |
| 2,884,786 | 5/1959 | Burk et al. | 73/359 |
| 3,818,761 | 6/1974 | Brixy et al. | 73/359 |
| 3,878,721 | 4/1975 | Nath | 73/351 |
| 3,890,841 | 6/1975 | Brixy | 73/359 |

Primary Examiner—Richard C. Queisser
Assistant Examiner—Frederick Shoon
Attorney, Agent, or Firm—Schiller & Pandiscio

[57] ABSTRACT

A thermometer based upon the measurement of spontaneous thermal noise in the form of electrical fluctuations in a sensor resistance, in which the sensor is included within an input circuit. The input circuit is inductively coupled to a matched circuit tuned to a selected band width of the noise and which includes the measuring electronics which preferably discriminates between random amplifier noise and the sensor signal by correlation techniques.

7 Claims, 3 Drawing Figures

NOISE THERMOMETER

This invention relates to thermometry and more particularly to improved absolute thermometers.

Conventional, practical thermometry has been based upon the temperature coefficient of some properties of a material such as its electrical resistance or mechanical expansion. However, the temperature coefficients of materials change in time, for example after prolonged exposure to high temperatures, high radiation flux levels and the like, necessitating frequent calibration. For a number of applications, degradation of thermometer function with time is unacceptable, while in other situations frequent thermometer calibration is either impossible or impractical. This problem is inherent on all thermometers that depend on the temporal stability of some material properties for calibration and accuracy.

A thermometer that measures thermal energy directly is the only type of device that would not be subject to sensor degradtion or require thermal calibration by periodic comparisions with a master thermometer. Such a device, called a fundamental or absolute thermometer, is exemplified by the classic ideal gas thermometer and its close relative, the Johnson noise thermometer. The latter type of device is based upon the measurement of spontaneous thermal noise in the form of electrical fluctuations arising in a sensor resistance. These fluctuations are known as Johnson noise and their origin and magnitude were first measured and calculated by Johnson and Nyquist in 1928 (Phys. Rev. 32, 97, (119)). Johnson noise affords a direct measurement of temperature on a thermodynamic scale. Thus Boltzmann's constant defines the temperature scale. Johnson noise thermometers do no demand stable or accurate sensors, so can be designed for ruggedness and the other desirable features, they do not dissipate heat, and they are linear in absolute temperature.

A number of such Johnson noise thermometers have been built, but exhibit some basic limitations. Typically, long averaging times of several seconds are needed to measure the very low level random thermal noise signal as the sensor. The Johnson noise thermometer is sensitive to electromagnetic interference and excessive noise contributions from the measuring circuit itself.

Nyquist and Johnson showed that the available noise power P (i.e. the power that would be delivered into a matched load) with a bandwidth of $\Delta f$ at the terminals of a sensor or resistor R at an absolute temperature T is given by the equation $$P = kT\Delta f \qquad (1)$$

which is valid at frequencies and temperatures where
$f/T$ is $<< 2 \times 10^{10}$ Hz deg.$^{-1}$ This condition is fulfilled even at cyrogenic temperatures and at frequencies in the microwave range. The open circuit voltage, $e$, across the sensor, corresponding to equation (1) is then given by:

$$e^2 = 4KT\Delta fR \qquad (2)$$

It will be apparent that if equation (2) is solved for T, the temperature is obtained simply from knowledge of the resistance, the bandwidth and the measured voltage, the link between electrical and thermal units being provided by Boltzman's constant K.

The accuracy of the Johnson thermometer is strongly affected by the noise of its own amplifier even when correlation techniques are employed to suppress the amplifier noise. Typical amplifiers for Johnson thermometers require high source impedances to yield a low noise figure and this poses several problems. First, the bandwidth is limited by the unavoidable input capacitance that is in parallel with the sensing resistor. Secondly, the shielding of the input against interference becomes difficult. Lastly, it is difficult to constuct small and rugged temperature sensors with very high resistance. These problems which plagued Johnson thermometers can be alleviated by complicated methods (such as comparison of the noise of two resistor-capacitor networks) with poor accuracy due to varying cable capacitance, sensor resistances and the like.

A principal object of the present invention is to provide a practical electrical noise thermometer which overcomes many of the problems of the prior art Johnson noise thermometer. The present invention generally is based upon the realization that in an electrical noise measuring system, the sensing resistor is only one part of a general RLC circuit and that the mean squared noise voltage in the circuit is given, in accordance with the equipartition law of thermodynamics as $$e^2C/2 = KT/2 \qquad (3)$$

where C is the circuit capacitance. This noise relationship was first pointed out by Schottky, *Annalen der Physik*, 57, 541 (1918), hence the thermometer of the present invention is termed herein a Schottky thermometer. Basically the present invention is embodied in a system for measuring the thermal noise in a resistor, which resistor is incorporated in an input circuit coupled to a tuned circuit which includes the measuring amplifier.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein.

Figure 1:
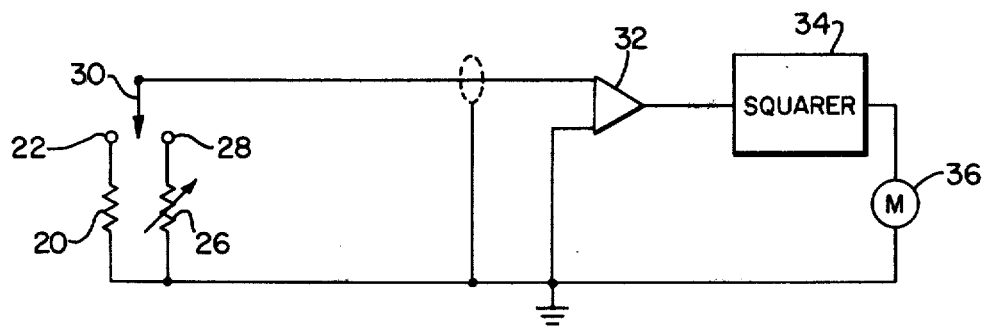
FIG. 1 is a typical simplified prior art circuit of a Johnson noise thermometer.

Referring now to FIG. 1, there will be seen a typical example of a Johnson noise thermometer of the prior art (somewhat simplified). Such a thermometer is substantially the same as that shown, for example in U.S. Pat. No. 2,728,836 issued Dec. 27, 1955 to D. R. De Boisblanc et al. The thermometer of FIG. 1 includes a temperature sensing resistor 20, typically that described in the aforementioned U.S. Pat. No. 2,728,836 coupled between switch electrode 22 and ground terminal 24. A reference variable resistance element 26 is similarly coupled between ground terminal 24 and switch terminal 28. Switch armature 30 which is movably mounted to contact either switch electrode 22 or electrode 28 in turn is coupled to one input of amplifier 32, the other input to amplifier 32 being connected to ground terminal 24. The output of amplifier 32 is coupled to square law detector 34. The output of square law detector 34 is connected in turn to meter 36.

In operating the thermometer, the impedances of resistors 20 and 26 are first equalized over a preselected frequency range for example by applying an AC voltage source of variable frequency successively across the two elements. The corresponding voltage drops are measured on meter 36 and the resistance of resistor 26 is adjusted to match that of resistor 20 over the preselected frequency range. Switch 30 is then locked to terminal 22 and the thermal noise voltage fluctuations generated within resistor 20 are read on meter 36. The thermal noise voltage read on meter 36 is the mean square value defined in equation (2) above.

Figure 2:
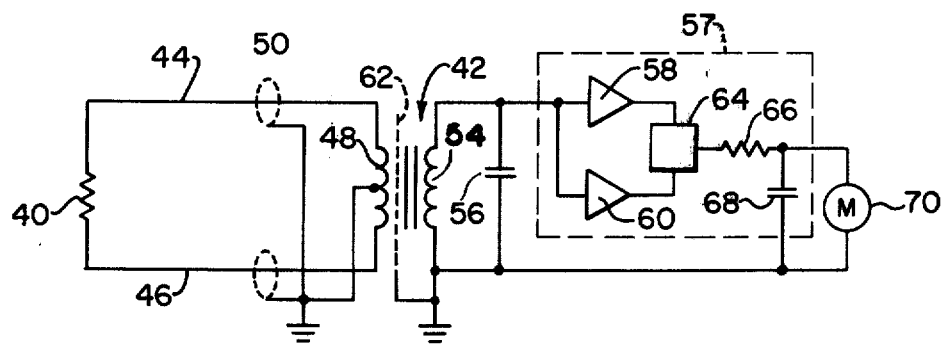
FIG. 2 is a schematic of a tuned circuit showing the principles of the present invention.

Referring now to FIG. 2 there is shown an embodiment of the present invention incorporating a temperature sensing resistor or sensor 40 coupled in the primary coil circuit of transformer 42 by a cable comprising leads 44 and 46 connected across primary coil 48 of the transformer. Leads 44 and 46 are preferably shielded by shield means 50 which is connected, in common with a center tap on primary coil 48, to ground for sensor 40. Secondary coil 54 of transformer 42 has coupled thereto in parallel, precision capacitor 56. The values for capacitor 56 and coil 54 are selected to tune the secondary circuit of the transformer to a selected frequency band $f_b$ of the thermal noise generated by sensor 40.

One side of precision capacitor 56 is coupled to amplifying means shown generally at 57, and preferably in common to the inputs of respective matched amplifiers 58 and 60. The other side of capacitor 56 is connected, in common with transformer shield 62, to ground for the electronic measuring system. The outputs of amplifiers 58 and 60 are connected to means, such as multiplier 64, for multiplying together the instantaneous amplitudes of the output signals from amplifiers 58 and 60. A filter, shown schematically simply as series resistor 66 and parallel capacitor 68, is coupled to the output of multiplier 64. The output of the filter, e.g. the junction of capacitor 68 and resistor 66 is coupled to an output measuring display or computation device exemplified by meter 70.

This inductive coupling of the input tuned circuit to amplifying means 57 allows independent grounding of sensor 40 and the amplifying electronics, thus permitting optimum design to eliminate interference pickup.

Essentially, then the device of FIG. 2 comprises a tuned circuit inductively coupled to sensor resistor 40 through transformer 52, the primary winding 48 of the latter being connected to temperature sensing resistor 40, and secondary winding 54 together with precision capacitor 56 constituting a tuned input circuit to amplifying means 57. Most simply regarded, the circuit is intended to measure the thermal noise of its own losses, the circuit parameters being selected so that the circuit losses are substantially those occurring in the sensor resistance.

For purposes of exposition, one can assume exemplary values for those selected circuit parameters of the embodiment of FIG. 2, which parameters would be typical for application of the device, for example, to a nuclear reactor, although the parameters for use in a cryogenic environment ( < 100°K) would be rather similar.

Figure 3:
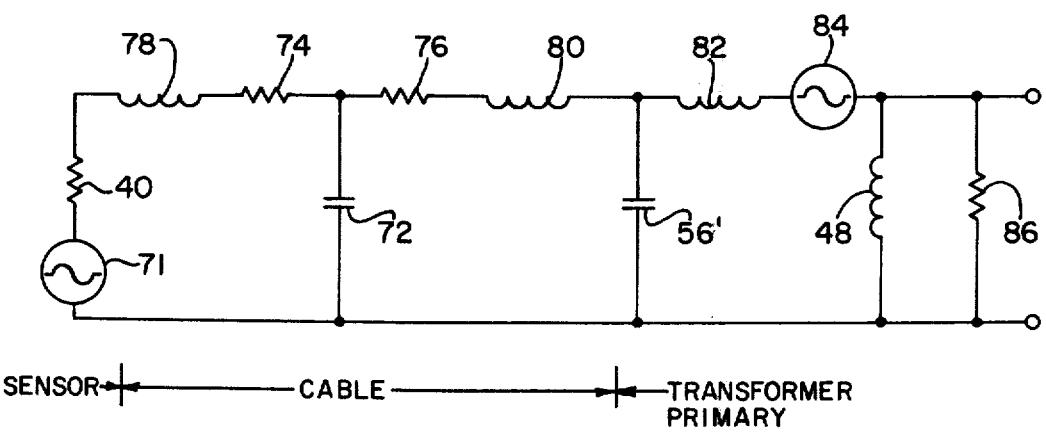
FIG. 3 is an equivalent circuit of the input portion of the circuit of FIG. 2.

Such exemplary parameters of the system are best described with reference to the equivalent input circuit shown in FIG. 3 (in which like numerals denote like parts) Resistor 40 preferably has a value which must be small enough to assure that most of the circuit losses are caused by it, but large enough to provide an acceptable Q, i.e. to concentrate the total noise power in a reasonably small band. Preferably the value of resistor 40 is less than about 1 k Ω and typically is about 100 Ω. Such low resistance makes the circuit relatively insensitive to cable capacitance and insulation quality. The impedance of sensor resistor 40 is assumed to be entirely ohmic and typically for a nuclear reactor the ambient temperature will be around 1800°K. The signal generated by resistor 40 is shown as generator 71. Leads 46 and 44 are typically a single 0.5 cm O.D. No. 26 symmetrical cable of 15 m in length. Such a cable is estimated to have a distributed or parasitic capacitance of about 1300 pf shown as capacitor 72 in parallel with resistor 40, to have a series distributed resistive impedance shown as a pair of 2 Ω resistors 74 and 76, and an inductive impedance shown as a pair of inductances 78 and 80 of about 4 μH each. At frequencies under 100 K Hz, the cable length is only a small fraction of a wavelength and therefore can be represented as shown in FIG. 3 by the lumped equivalent T — figures with the values specified.

The estimated leakage inductance (shown as 82) of transformer primary 48 is about 10 μ H. FIG. 3 also includes generator 84 which represents noise current from the transformer losses as converted to an equivalent voltage. Lastly, the transformer primary is represented by inductor 48 which is in parallel with capacitor 56' (representing the capacitance of capacitor 56 transformed by the square of the turns ratio of the transformer). Inductor 48 represents an estimated mutual inductance of transformer 42 of about 300 μH as seen from the primary. In parallel with inductor 48 is resistor 86 which represents all the ohmic transformer losses estimated to be about 2,8KΩ (assuming high quality ferrite pot core design).

The turns ratio, primary to secondary, for transformer 42 is typically about 1:57 in this example, thereby to transform the impedances to the input of amplifying means 57 to provide a good noise match.

Preferably, cables or leads 44 and 46 should be a twisted shielded pair of leads or a floating coaxial line which should match sensor 40 in characteristic impedance to reduce the reactive component seen by the readout electronics. The use of two twisted conductors cancels electronic interference and shielding minimizes electrostatic interference. By grounding shield 50, galvanic interferences are prevented.

If one sums the stray thermal noise signals contributed by sensor 40 ($e_s$), from leads 44 and 46 ($e_c$), and current from transformer 52 ($i_T^2$), one obtains the total voltage $e_o^2$ as follows:

$$e_o^2 = e_s^2 + e_c^2 + (i_T^2 R)^2 \qquad (4)$$

R being the ohmic resistance of sensor 40. The last term in equation (4), the noise current from the transformer losses, is shown as generator 84 and is converted into an equivalent voltage in computing the value of the total signal.

The first term in the above equation is the desired signal and is several orders of magnitude greater than the sum of the thermal noises from transformer 42 and leads 44 and 46.

The line capacitance 72 of about 1300 pF is negligible compared to the comparatively large capacitance of transformed tank capacitor 56'.

While the foregoing discussion assumes the resistance of sensor 40 is independent of frequency, this is not always the case because of such effects as inductive coupling to adjacent conductors, frequency dependent losses in insulators, and skin effects. The first two phenomena can be reduced by winding the resistor non-inductively, maintaining sufficient distance from shield 62 and by choosing one's insulating material carefully. The skin effect, for appropriate materials, and frequencies up to a few hundred KHz and wire size less than 0.1 mm diameter can be neglected in a first design iteration. For example, the sensor element for use in a nuclear reactor can be tungsten rhenium alloy 74W26Re, or pure rhenium wound on a beryllium oxide former and enclosed in a tantalum sheath.

It will be apparent to those skilled in the art that the tuned input circuit of FIG. 2 will have a very different frequency response to thermal noise than the prior art circuit of FIG. 1 or other conventional Jonnson noise thermometer circuits. This can be shown by consideration of the operation of the circuit of FIG. 2. The input voltage seen by amplifier 57 can be deduced directly from the equipartition law which requires that half of the total thermal energy should always be stored in capacitor 56 where C in equation (3) is the capacitance of capacitor 56.

The foregoing result can also be obtained by consideration of the open circuit terminal voltage and the frequency response of the circuit. In any event, equation (3) differs remarkably from equation (2) [which is typical of the prior art]; equation 3 contains neither the sensor resistance nor the bandwidth as a factor. Instead, integration of all noise from DC to infinite frequencies is implied. However, in fact infinite bandwidth is neither possible nor required, because almost all of the noise power will be in the vicinity of the resonant frequency $w_o$ of the system. How the power is distributed among the frequencies will depend on the loaded Q of the circuit. Because in practice the system in FIG. 2 is limited to operation within some finite frequency interval about the resonant frequency $w_o$ there will be some sensitivity to the resistance value of sensor 40. Computed on the basis of selected upper and lower cut-off frequencies around the resonant frequency, (e.g. the interval from about 3 to 100 kHz) the total temperature error caused by a resistance change can be shown to be only a very small fraction of the signal itself, and in practice to be negligible.

Preferably as shown in FIG. 2 the amplifying means 57 is a correlation amplifier typified by two entirely different independent amplifiers 58 and 66 of identical gain and bandwidth connected to sensor 40 and having the output signals thereof multiplied by one another by multiplier 64. This results in uncorrelated amplifier noises being averaged out while the common voltage representing sensor noise is squared, filtered and measured in meter 70. However, such correlation technique is most beneficial at low temperatures and a high temperature noise thermometer can readily be built without recourse to any correlation methods. Such a multiplier requires a large dynamic range because it must handle the noise peaks from both amplifiers while its offset errors must be small compared to the typical mean squared output. The multiplier may be either digital or analog, although the latter is less expensive but much less accurate.

There are several important practical advantages that the Schottky thermometer of the present invention has over the prior art Johnson noise thermometer. Calibration of the Schottky thermometer is virtually independent of sensor resistance. In the present invention, very large capacitances in parallel with the sensor, and hence very long input cables, can be tolerated. The sensor of the present invention is insulated from the electronics, and the system can be designed to eliminate interference pickup or to operate at high DC potentials. The resonant frequency of the present circuit can be selected so as to minimize interference problems. Lastly, all of the foregoing benefits are attained with a circuit simpler than those of the prior art of comparable ambitions.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A thermometer which measures spontaneous thermal noise in the form of voltage fluctuations across a sensor resistor, said thermometer comprising in combination:

an electrical circuit inductively coupled to said resistor and being tuned so that the losses in said circuit are substantially caused by said sensor resistor, the parameters of said circuit being so matched to the sensor resistor and the inductive coupling that the thermal noise power generated by said resistor is concentrated in a selected frequency band, said inductive coupling being a transformer, the primary of which is connected across said resistor, said electrical circuit including the secondary winding of said transformer and a precision capacitor connected across said secondary winding; and
   means connected in said electrical circuit for measuring the absolute mean square value of said voltage fluctuations.

2. A thermometer as defined in claim 1 wherein said resistor is connected to said primary winding through shielded leads connected to a first independent ground.

3. A thermometer as defined in claim 2 wherein said means for measuring is grounded to a second independent ground.

4. A thermometer as defined in claim 2 wherein the ohmic value of said resistor is less than about 1 KΩ.

5. A thermometer as defined in claim 2 wherein said precision capacitor has a value of capacitance much greater than the distributed capacitance of said shielded leads.

6. A thermometer as defined in claim 1 wherein said measuring means comprises correlation amplification means.

7. A thermometer as defined in claim 6 wherein said correlation amplification means comprises a pair of amplifiers of identical gain and bandwidth connected to a common input, and said means for measuring includes
   means connected to the outputs of said amplifiers for multiplying together the output signals from said amplifiers,
   means for filtering the output signal from said means for multiplying, and
   means for determining the magnitude of the output signal from said means for filtering.

* * * * *